UNITED STATES PATENT OFFICE.

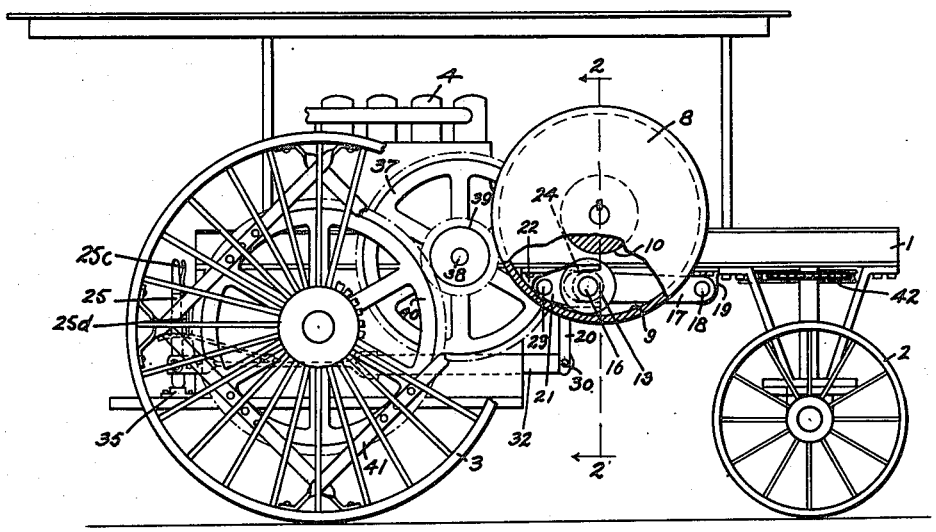

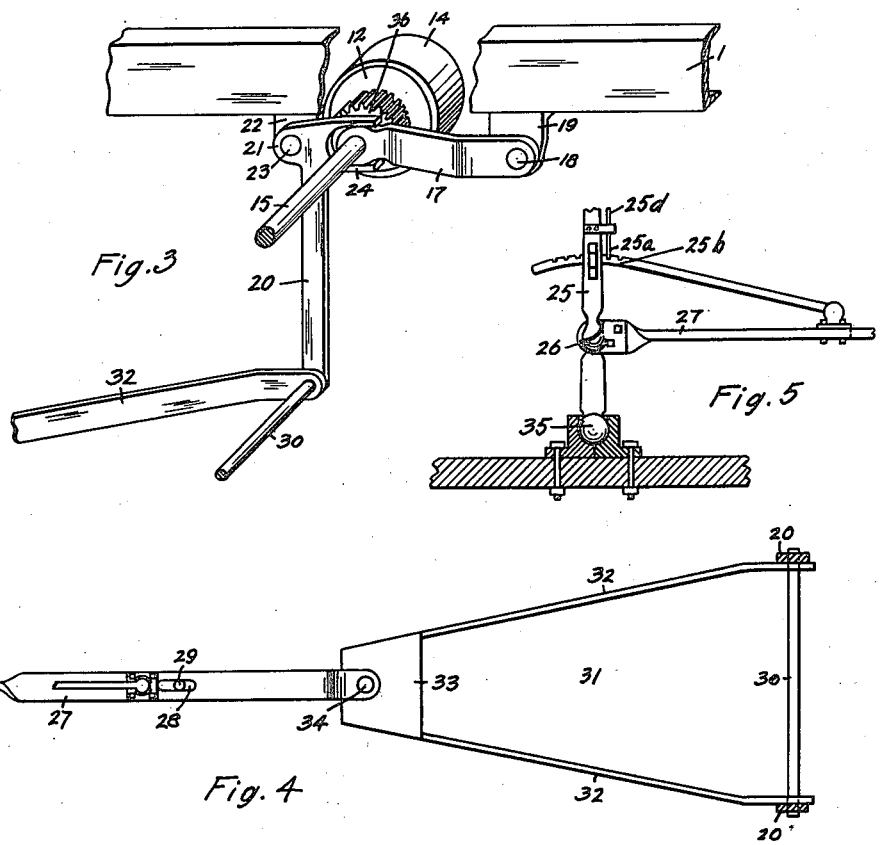

EDMURN L. DEMOREST, OF DELAWARE, OHIO.

GEARING.

1,168,290.  Specification of Letters Patent.  Patented Jan. 18, 1916.

Application filed September 11, 1913. Serial No. 789,395.

*To all whom it may concern:*

Be it known that I, EDMURN L. DEMOREST, citizen of the United States, residing at Delaware, in the county of Delaware and State of Ohio, have invented certain new and useful Improvements in Gearing, of which the following is a specification.

My invention relates to controlling mechanism for use with self propelled vehicles in general, but particularly applicable to tractors and the like for use in farm work. In this latter class of work, especially in plowing, it is desirable that the tractor be able to turn a square corner in order that practically all of the ground may be plowed. Various endeavors have been made to carry out this end, but my invention resides particularly in applying power separately to each of the driving wheels of the vehicle and controlling the application of power to rotate the wheels in opposite directions and to reverse the direction of the wheels without reversing the engine. In other words, I aim to rotate one of the driving wheels in the forward direction while the opposite driving wheel is rotated in a reverse direction. This, when the front rotary support of the vehicle is properly set, enables me to completely turn the vehicle in a minimum amount of space. The above I accomplish by a particularly novel structure hereinafter more specifically claimed.

My invention is not, however, limited to the particular reverse power applications outlined above for the reason that it is not always desirable to turn a square corner and my invention also includes a construction for permitting turning of the vehicle in such a circle as may be necessary or desirable, as well as complete reversal in motion of the vehicle without reversing the engine.

Other advantages and objects of my invention will become more apparent after a further detailed description of the accompanying drawings in which similar characters of reference designate corresponding parts and in which—

Figure 1 is a side elevation of one form of tractor shown somewhat diagrammatically and embodying the features of my invention. Fig. 2 is a section taken on line 2—2— Fig. 1, Fig. 3 is a fragmentary perspective of a portion of the main controlling structure, Fig. 4 is a top plan view of the controlling mechanism, and, Fig. 5 is a view, partially in section, of the operator's end of the controlling mechanism.

It will be understood that my invention is not limited in its use to tractors of the type shown in the drawings, but includes all such vehicles to which it may be applicable. For purposes of illustration, I have shown a well known type of tractor comprising a framework of channel iron construction 1 as supported by rotatably mounted front wheel 2 and rear driving wheel 3. Carried upon the frame work 1 in any desired manner is an engine 4, which engine is connected with the transmission carried within the transmission casing 5 in the usual manner. It will be noted that this transmission casing is mounted upon the channel irons 1, and has passing through it a drive shaft 6, carrying friction driving wheels 7 and 8 upon its opposite ends. These friction driving wheels are of a somewhat peculiar construction in that they are formed with internal rim friction surfaces 9 and hub friction surfaces 10, the wheels themselves being held in position upon their shaft by keys 11. Carried in the annular spaces formed by the rims and hubs of the driving wheels are complemental friction driven wheels 12 and 13 having a leather or paper or other friction facing 14. These driven wheels 12 and 13 are respectively mounted upon stub shafts 15 and 16 carried in a manner to be presently described. It may be well to state at this point that the controlling mechanism to be presently described is such that the driven wheels 12 and 13 may be moved bodily with their respective shafts in a vertical direction to bring the facings 14 into engagement with the rim or hub friction surfaces of the main drivers as may be desired. It is evident that, given a constant rotation, in one direction of the drivers 7 and 8, the direction of rotation of the stub shafts 15 and 16 will be reversed by this engagement with one of the friction surfaces of the main drivers and engagement with the other friction surfaces of the drivers. To accomplish this bodily movement of the driven wheels 12 and 13 in a vertical direction, I have given their shafts a bearing in one of the ends of the rocker arms 17, the opposite ends of these rocker arms being pivotally supported at 18 from brackets 19 depending from the channel iron framework only. This pivotal mounting of the rocker arm 17 permits an oscillatory movement of the stub shafts themselves, but this oscillatory movement is under the control of levers 20 constructed after the manner of bell cranks.

By reference particularly to Fig. 3, it will be noted that the levers 20 are provided with heel portions 21 serving as a means of pivotal attachment to depending brackets 22 as shown at 23. Projecting forward from the heel portion 21, and preferably in horizontal alinement are the bifurcated portions 24, these bifurcated portions embracing the ends of the rocker arm 17 through which the stub shafts pass. Owing to this embracing engagement, it will be apparent that the slight movement of the long arm of the member 20 will cause the slight oscillatory movement of the rocker arm 17 as outlined above, thereby causing the friction driven members 12 and 13 to move between the rim friction surfaces 9 and the hub friction surfaces 10 in a substantially vertical line. The slight movement imparted to the long arms of the members 20 is controlled from the rear portion of the tractor through the medium of an operating handle 25, which operating handle is firmly held in any adjusted position by the coöperation of the dog 25$^a$ with the rack segment 25$^b$, the dog 25$^a$ being under the operator's control through the connection of the hand grip 25$^c$ with the connecting rod 25$^d$. This operating handle is universally connected as at 26 to a bar 27 provided at approximately its center with a slot 28. Projecting upwardly from the base work or frame work of the machine in any desired manner is a pivot bolt 29 about which the bar 27 is adapted to move. The lower ends of the levers 20 are apertured and are adapted to receive a rod 30, this rod being used particularly for giving rigidity to the levers 20 in their spaced relation. The connecting element between the levers 20 and the bar 27 is designated 31 as an entirety, and comprises converging bars 32 pivotally attached to rod 30 at their forward ends and rigidly attached to gusset plates 33 at their rear, these gusset plates forming a very desirable base for the pivotal connection to the bar 27 as is clearly shown at 34. It will thus be apparent that a forward movement of the operating handle 25 about the pivotal mounting at its base as shown at 35 will cause forward movement of the bar 27, the pin and slot connection permitting this forward movement, and in turn will cause the elevation of the friction wheels 12 and 13 through the elevation of their respective shafts under the control of the lever elements 20. Shifting of the operating lever in this manner will naturally cause reverse movement of the vehicle as a whole inasmuch as the stub shafts 15 and 16 also carry pinions 36, which mesh with gears 37 mounted upon shafts 38 in any desired manner. These shafts 38 also carry bull pinions 39 which mesh with bull gears 40 rigidly mounted upon the driving wheels 3 by means of the strap construction 41. It is equally obvious that the movement of the operating handle 25 toward the left will cause the friction driven wheels 12 and 13 to again come into engagement with the rim friction surface of the friction drivers 7 and 8.

From the description thus far given, the shafts upon which the friction wheels 12 and 13 are mounted are not of necessity made separate, but where a right angle turn is desired, this construction is necessary with the particular type of control illustrated. By reference to Fig. 5, it will be noted that the mounting of the operating lever 25 is such that it may be swung forwardly or rearwardly or given a sidewise movement in either direction because of the ball and socket engagement as shown at 35, it being understood that this mounting is upon any portion of the frame structure. If the right angular turn is desired, the operating handle 25 is preferably set to somewhat near its neutral position and is then given a sidewise movement in the direction that it is desired to turn, it being assumed that the front supporting wheels 2, of course, have been moved to the proper position to facilitate its turning by means of the chain and sprocket construction shown at 42. Subsequent movement of the operating lever 25 as mentioned will cause the bar 27 to pivot about the bolt 29, causing the forward end of this bar to assume a position on the opposite side of a center line from its rear end. Owing to the connection of the rod 30 between the levers 20, the entire connecting element 31 will be caused to swing about an imaginary pivot disposed at a point centrally of the length of the rod 30, it being understood that this movement is caused by the movement of the forward end of the bar 27. This condition causes one of the levers 20 to swing forwardly and the opposite lever 20 to swing rearwardly thereby respectively elevating and lowering the friction driven wheels to come into engagement with the hub and rim friction surfaces of the friction drivers. It will, therefore, be apparent that one of the main drivers 3 is turned in a forward direction while the opposite driver is turned in a reverse direction whereby the entire vehicle pivots about a point disposed centrally of the length of the rear axle from which it is believed that a clear conception of the right angular turn will be had.

Should it, however, be desired to turn the vehicle at an obtuse angle, it is desirable to have one of the friction driven wheels 12 or 13 in driving engagement with the corresponding friction driver 7 or 8 as the case may be. This condition may be had by moving the operating handle 25 say slightly forward and firmly holding it in this position by the dog and rack structure. A movement then of the operating handle 25 sidewise will place a slight strain upon the structures 27 and 31 connecting the lever arms 20 whereby one of the friction driven wheels will be moved entirely out of engagement with its friction driver, while the other wheel will be more firmly pressed into gripping engagement. This will allow power application to one of the driving wheels 3 only whereby a turn of any desired angle may be had depending upon the position of the front supporting wheels 2.

From the above description, it will be apparent that I am enabled to make a turn of any desired angle down to ninety degrees by the simple manipulation of the operating handle 25 and in so doing I have dispensed entirely with the usual type of differential gearing. This I claim to be a great advantage in a number of ways.

By referring to Fig. 2, it will be seen that I have provided a resting support for the inner ends of the stub shafts 15 and 16. It frequently is the case that during the continued use of the type of friction drive shown, the friction wheels 12 and 13 will not return to a resting position upon their complemental friction surfaces on the drivers in an absolutely flat position. Therefore, one edge of the driven members only will be in engagement causing a great reduction in the efficiency of the machine. I have, therefore, provided these resting supports whereby the inner ends of these stud shafts may be adjusted to at all times insure the proper return of the driven members. These resting supports are shown in the form of U-shaped members 43 securely fastened to the underside of the transmission casing 5. Within each of these U-shaped members there is mounted a vertically slidable bearing block 44 having a socket connection with an adjusting screw 45. Therefore, vertical adjustment of these bearing blocks 44 under the control of the screws 45 is made possible and thereby their adjustment insures the proper return to a position of engagement of the friction members 12 and 13.

What I claim is:

1. In a vehicle of the class described, drivers having opposed working faces, complemental driven structures for said drivers arranged to coöperate with either of their opposed working faces, the complemental driven structures for the different drivers being operable independently of each other, and means for moving one of said driven structures into engagement with one face of its corresponding driver and moving the other complemental driven structure into engagement with the opposite face of its corresponding driver.

2. In a vehicle of the class described, drivers having opposed working faces, complemental driven structures for said drivers arranged to coöperate with either of their working faces, the complemental driven structures for the different drivers being operable independently of each other, and controlling mechanism comprising an operating lever, and means connected with and under the control of said lever for moving one of said driven structures into engagement with one face of its corresponding driver and moving the other complemental driven structure into engagement with the opposite face of its corresponding driver.

3. In a vehicle of the class described, drivers having opposed working faces, complemental driven structures for said drivers arranged to coöperate with either of their opposed working faces, the complemental driven structures for the different drivers being operable independently of each other, and means for moving one of said driven structures into engagement with one face of its corresponding driver and moving and keeping the other complemental driven structure out of engagement with either of the opposed faces of its corresponding driver.

4. In a vehicle of the class described, drivers having opposed working faces, complemental driven structures for said drivers arranged to coöperate with either of their working faces, the complemental driven structures for the different drivers being operable independently of each other, a controlling mechanism comprising an operating lever, and means connected with and under the control of said lever for moving one of said driven structures into engagement with one face of its corresponding driver and moving and keeping the other complemental driven structure out of engagement with either of the opposed faces of its corresponding driver.

5. In a vehicle of the class described, drivers having opposed working faces, complemental driven wheels having working faces adapted to coöperate with either of the opposed working faces of said drivers, and means for moving one of said driven wheels into engagement with one face of its complemental driver and moving the other driven wheel into engagement with the opposite face of its complemental driver.

6. In a vehicle of the class described, drivers having opposed working faces, complemental driven wheels having working faces adapted to coöperate with either of the opposed working faces of said drivers, and controlling mechanism comprising an operating lever, and means connected with and under the control of said lever for moving one of said driven wheels into engagement with one face of its complemental driver and moving the other driven wheel into engagement with the opposite face of its complemental driver.

7. In a vehicle of the class described, friction driving wheels having opposed friction surfaces, and friction driven wheels rotatable independently of each other and each adapted to rotate in one direction on contact with one of said surfaces and in reverse direction on contact with the opposed surface.

8. In a vehicle of the class described, friction drivers having opposed friction surfaces, complemental friction driven wheels, and means for moving one of said driven wheels into engagement with one surface of its complemental driver, and moving the other driven wheel into engagement with the opposite surface of its complemental driver.

9. In a vehicle of the class described, friction drivers having opposed friction surfaces, complemental friction driven wheels, and common means for moving one of said driven wheels into engagement with one surface of its complemental driver and moving the other driven wheel into engagement with the opposite surface of its complemental driver.

10. In a vehicle of the class described, friction drivers having opposed friction surfaces, complemental friction driven wheels, a controlling mechanism comprising an operating lever, and means connected with and under control of said lever for moving one of said driven wheels into engagement with one surface of its complemental driver and moving the other driven wheel into engagement with the opposite surface of its complemental driver.

11. In a vehicle of the class described, friction drivers having opposed friction surfaces, complemental friction driven wheels, a controlling mechanism comprising an operating lever, and means connected with and under control of said lever for moving said driven wheels simultaneously into or out of engagement with either of said surfaces, said controlling mechanism being also operable to simultaneously move one driven wheel into engagement with one surface of its complemental driver and the other driven wheel into engagement with the opposite surface of the complemental driver or out of engagement with either surface.

12. In a vehicle of the class described, a pair of friction drivers having hub and rim friction surfaces, a pair of complemental friction driven wheels, and means for moving one of said friction driven wheels into engagement with the rim of its complemental friction driver and moving the other friction driven wheel into engagement with the hub of the other friction driver.

13. In a vehicle of the class described, a pair of friction drivers having hub and rim friction surfaces, a pair of complemental friction driven wheels, a pair of stub shafts upon which said last wheels are mounted, leverage mechanism operable to move said friction driven wheels on their respective shafts out of engagement with said rim surfaces and onto said hub surfaces or vice-versa, said leverage mechanism being also operable to simultaneously move one of said friction driven wheels into engagement with the rim surface on its complemental friction driver and the other friction driven wheel into engagement with the hub surface on its complemental friction driver.

In testimony whereof I affix my signature in presence of two witnesses.

EDMURN L. DEMOREST.

Witnesses:
WALTER E. L. BOCK,
L. A. DEMOREST.